(12) United States Patent
   Tierney

(10) Patent No.: US 8,622,023 B1
(45) Date of Patent: Jan. 7, 2014

(54) PET LITTER BOX

(71) Applicant: Patricia Ann Tierney, Cape Coral, FL (US)

(72) Inventor: Patricia Ann Tierney, Cape Coral, FL (US)

( * ) Notice: Subject to any disclaimer, the term of this patent is extended or adjusted under 35 U.S.C. 154(b) by 0 days.

(21) Appl. No.: 13/710,434

(22) Filed: Dec. 10, 2012

Related U.S. Application Data

(63) Continuation-in-part of application No. 12/882,866, filed on Sep. 15, 2010, now Pat. No. 8,327,801.

(51) Int. Cl.
   *A01K 1/01* (2006.01)

(52) U.S. Cl.
   USPC ............................................ 119/165; 119/166

(58) Field of Classification Search
   USPC .................. 119/165, 166, 169, 170, 458, 469
   See application file for complete search history.

(56) References Cited

U.S. PATENT DOCUMENTS

| | | | | |
|---|---|---|---|---|
| 3,796,188 A * | 3/1974 | Bradstreet | ...................... | 119/166 |
| 4,469,046 A * | 9/1984 | Yananton | ...................... | 119/169 |
| 4,517,920 A * | 5/1985 | Yamamoto | ...................... | 119/166 |
| 4,926,794 A * | 5/1990 | Yamamoto | ...................... | 119/165 |
| 4,970,987 A * | 11/1990 | Deyle | ............................ | 119/166 |
| 5,193,488 A * | 3/1993 | Walton | ........................... | 119/166 |
| 5,211,133 A * | 5/1993 | Foley | ............................ | 119/166 |
| 5,220,886 A * | 6/1993 | Hyde | ............................. | 119/165 |
| 5,515,812 A * | 5/1996 | Faust | ............................ | 119/166 |
| 5,749,317 A * | 5/1998 | Richey et al. | ................. | 119/166 |
| 6,059,247 A * | 5/2000 | Olivadoti | ................. | 248/346.04 |
| 6,332,429 B1 * | 12/2001 | Gramlich | ........................ | 119/165 |
| 6,487,989 B2 * | 12/2002 | Yamamoto | ..................... | 119/161 |
| 6,523,495 B1 * | 2/2003 | Rydman | ......................... | 119/167 |
| 6,742,476 B2 * | 6/2004 | Sage, Jr. | ......................... | 119/166 |
| 6,994,054 B2 * | 2/2006 | Matsuo et al. | ................ | 119/166 |
| 7,107,933 B2 * | 9/2006 | Mohr | ............................. | 119/166 |
| 7,128,023 B2 * | 10/2006 | Otsuji et al. | ................... | 119/169 |
| 7,131,396 B2 * | 11/2006 | Matsuo et al. | ................ | 119/166 |
| 7,380,519 B2 * | 6/2008 | Ikegami et al. | ................ | 119/167 |
| 8,113,146 B2 * | 2/2012 | Askinasi | ......................... | 119/169 |
| 2009/0126643 A1 * | 5/2009 | Fountain et al. | ............. | 119/165 |
| 2010/0224133 A1 * | 9/2010 | Hiroshima et al. | ........... | 119/169 |
| 2010/0275853 A1 * | 11/2010 | Petersen | ......................... | 119/165 |

* cited by examiner

*Primary Examiner* — Yvonne Abbott
(74) *Attorney, Agent, or Firm* — Michael D. Eisenberg

(57) ABSTRACT

A pet litter box comprises a housing, a detachable wall, and a grid. The housing comprises a left wall, right wall, front wall, and back wall that define a well. The left, right, and back walls comprise a plurality of apertures on the top of the walls. The detachable wall comprises three plates that connect to the apertures on top of the walls of the housing. The grid comprises a plurality of holes between grid lines and a locking mechanism. The grid slides into the well and the locking mechanism attaches to the front wall of the housing. A locking frame with an aperture locks over the grid.

16 Claims, 11 Drawing Sheets

PET LITTER BOX

CROSS-REFERENCES TO RELATED APPLICATIONS

This application is a continuation in part of U.S. application Ser. No. 12/882,866 filed on Sep. 15, 2010, now U.S. Pat. No. 8,327,801, which claims priority from U.S. Provisional Application Ser. No. 61/242,794 filed on Sep. 15, 2009, which are each hereby incorporated herein by reference their entirety.

TECHNICAL FIELD

The present invention, in some embodiments thereof, relates to an apparatus for managing pet waste.

BACKGROUND OF THE INVENTION

The present invention relates to pet litter boxes and has particular application as a dog litter box.

BRIEF SUMMARY OF EMBODIMENTS OF THE INVENTION

A pet litter box comprises a housing, a detachable wall, and a grid. The housing comprises a left wall, right wall, front wall, and back wall that define a well. The left, right, and back walls comprise a plurality of apertures on the top of the walls. The detachable wall comprises three plates. A first plate comprises a plurality of sides, wherein a first side has a plurality of posts that connect to the apertures on the top of the left wall and a second side has at least one tab. A second plate comprises a plurality of sides, wherein a first side has a plurality of posts that connect to the apertures on the top of the right wall and a second side has at least one tab. A third plate comprises a plurality of sides, wherein a first side has a plurality of posts that connect to the apertures on the top of the back wall; a second side has a recess that connects to the one or more tabs on the first plate; and a third side has a recess that connects to the one or more tabs on the second plate. The grid comprises a plurality of holes between grid lines and a locking mechanism. The locking mechanism of the grid attaches to the front wall of the housing. A locking frame with an aperture locks over the grid.

In a variant of the pet litter box, the depression in the wall of the housing is disposed below the ridge and the depression and the ridge are disposed in the same walls.

In another variant of the pet litter box, a pair of ridges in the housing is spaced apart at an equal height above the bottom of the well and two depressions are spaced apart an equal height above the bottom of the well and below the ridges.

In a further variant of the pet litter box, a pair of tabs on the grid is spaced apart at a distance equal to the distance between the depressions in the housing.

In still another variant of the pet litter box, the grid includes a locking mechanism along an edge of the grid that is configured to engage with a mechanism on the locking frame.

In yet a further variant, the pet litter box comprises an absorbent layer between the grid and the locking frame. The absorbent layer is configured in size and shape to completely cover the grid and the locking frame secures the layer to the grid.

In a further variant of the pet litter box, a first locking mechanism on an outside wall of the housing engages with a locking mechanism on the grid and a second locking mechanism on the locking frame engages with a locking mechanism on the grid.

In still another variant, the pet litter box comprises an artificial grass layer above the absorbent pad.

In yet a further variant, the pet litter box comprises a housing, a detachable wall, a grid, an absorbent layer, and artificial grass. The housing comprises a left wall, right wall, front wall, and back wall that define a well. The left, right, and back walls comprise a plurality of apertures on the top of the walls and at least one wall comprises at least one depression and ridge. The detachable wall comprises three plates. A first plate comprises a plurality of sides, wherein a first side has a plurality of posts that connect to the apertures on the top of the left wall and a second side has at least one tab. A second plate comprises a plurality of sides, wherein a first side has a plurality of posts that connect to the apertures on the top of the right wall and a second side has at least one tab. A third plate comprises a plurality of sides, wherein a first side has a plurality of posts that connect to the apertures on the top of the back wall; a second side has a recess that connects to the one or more tabs on the first plate; and a third side has a recess that connects to the one or more tabs on the second plate. The grid comprises a plurality of holes between grid lines, tabs, and a locking mechanism. The tabs of the grid slide into the depression in a wall of the housing and the locking mechanism attaches to the front wall of the housing. A locking frame with an aperture locks into the well of the housing, below the ridge and over the grid, and also locks onto the grid. The absorbent layer is between the grid and the locking frame. The artificial grass layer is above the absorbent layer.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention, in some embodiments thereof, relates to a pet litter box. Referring to the FIGS. 1-14, the pet litter box 10 comprises a housing 12, a detachable wall 14, and a grid 16.

Figure 2:
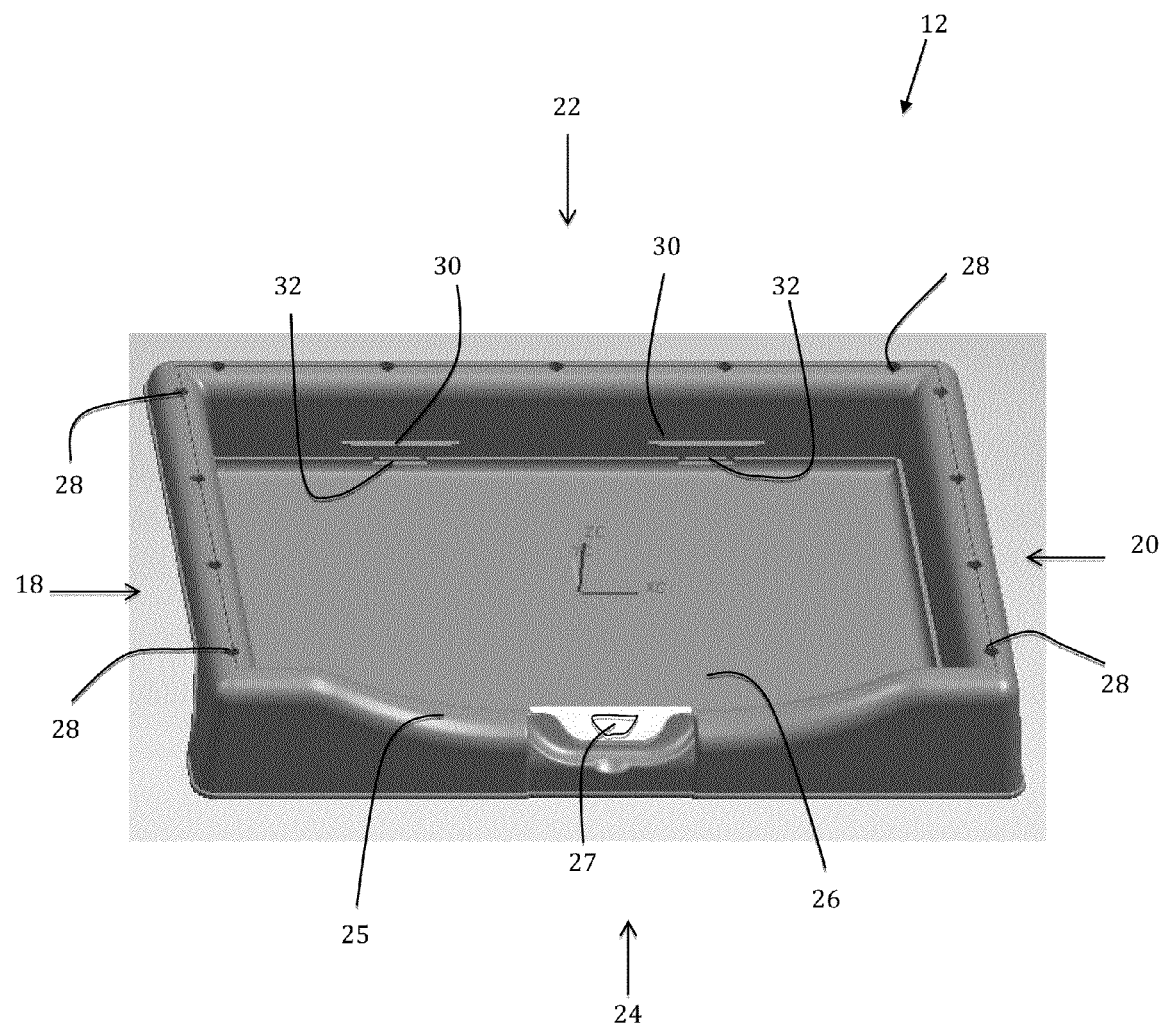
FIG. 2 is a perspective view of the housing of the pet litter box of FIG. 1.

In FIG. 2, the housing 12 comprises a left wall 18, a right wall 20, a back wall 22, and a front wall 24 that define a well 26. The top of the left wall 18, the right wall 20, and the back wall 22 further comprise a plurality of apertures 28. Each aperture 28 is sized and dimensioned for receiving a post 56 in the detachable wall 14. The back wall 22 includes a pair of ridges 30 and a pair of depressions 32 below the ridges 30. The pair of ridges 30 may be spaced apart at an equal height above a bottom of the well 26 and the pair of depressions 32 may be spaced apart an equal height above the bottom of the well and below the ridges 30. The front wall 24 has a curved cutout 25 to permit easy ingress and egress to the litter box and a locking mechanism 27 that engages with the locking mechanism 66 on the grid. The locking mechanism 27 is a tab that allows a hook 70 on the grid 16 to catch the tab and secure the grid 16 to the housing 12.

Figure 3:
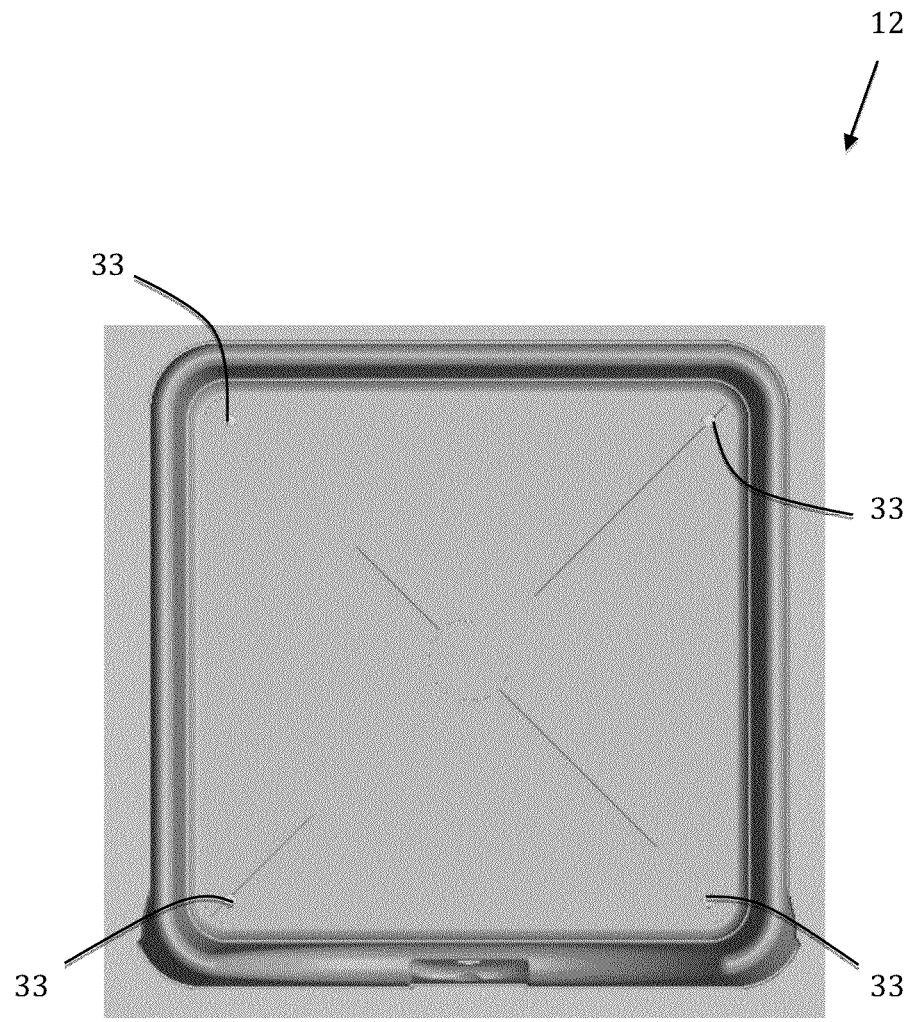
FIG. 3 is a plan view of the bottom of the housing of FIG. 2.

The bottom of the housing 12 may comprise anti-skid pads 33, as shown in FIG. 3, that allow the pet litter box 10 to grip to a surface.

Figure 4:
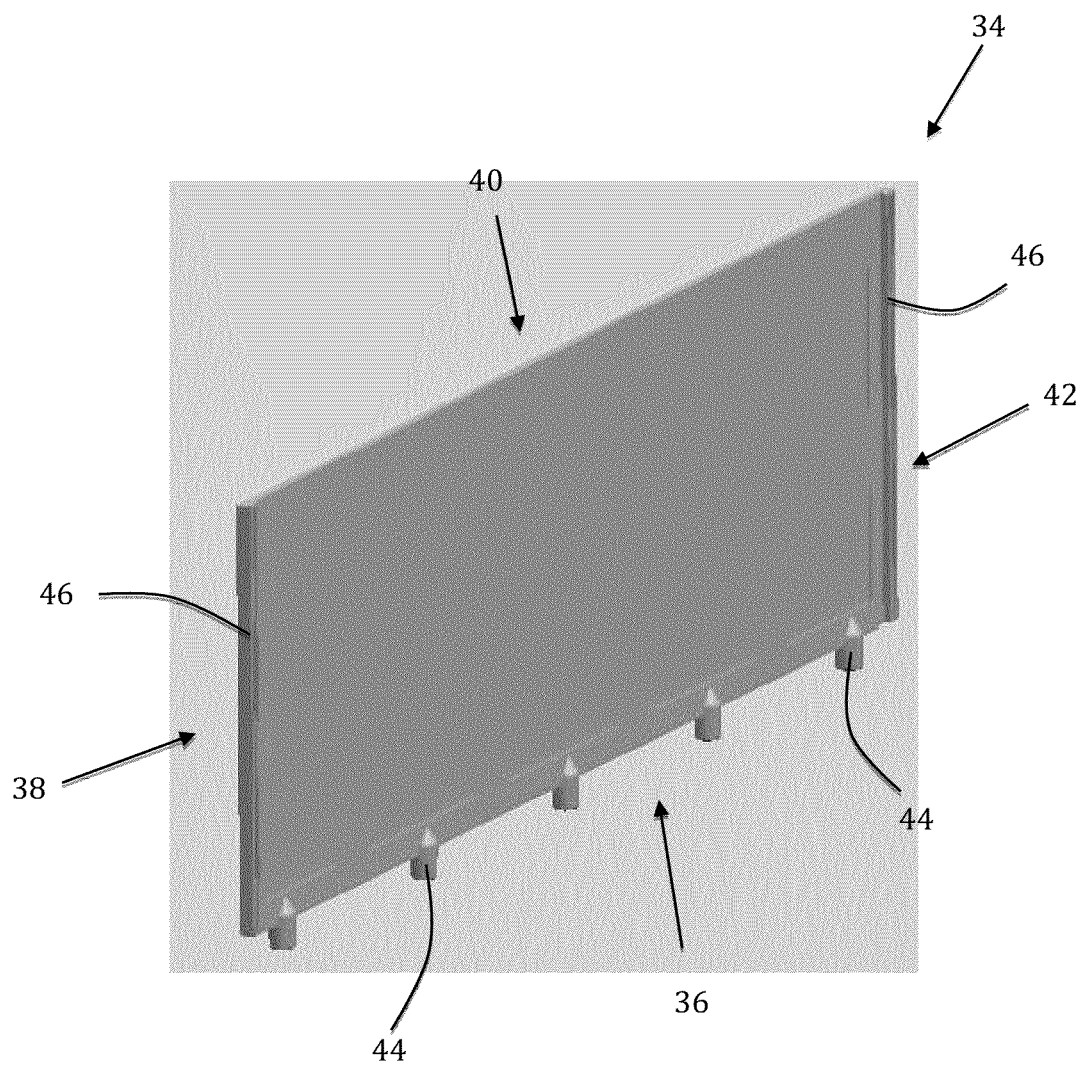
FIG. 4 is a perspective view of a first wall of the pet litter box of FIG. 1.
Figure 5:
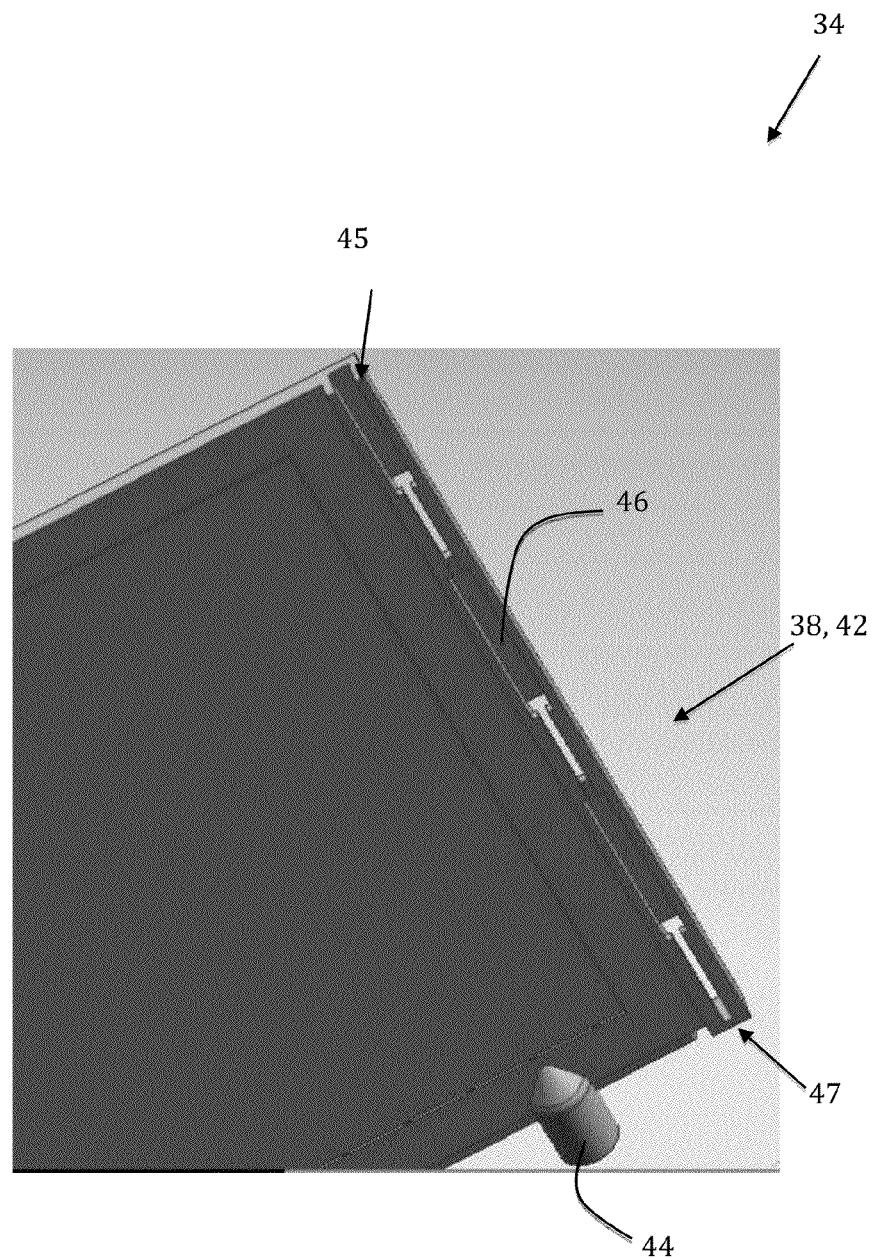
FIG. 5 is a perspective view of a second wall of the pet litter box of FIG. 1.

The detachable wall 14 extends the depth of the housing 12 so that male pets can use the pet litter box 10 without creating a mess on the floor. The detachable wall 14 comprises three plates that snap together. In FIG. 4, the first plate 34 has a first side 36, a second side 38, a third side 40, and a fourth side 42. The first side 36 comprises a plurality of posts 44 that are sized and dimensioned for connected to the apertures 28 on the top of the back wall 22 of the well 26. The second side 38 and fourth side 42 comprise a recess 46 that is sized and dimensioned for receiving a tab 58 on the second and third plates 48. The recess 46 is shaped like a channel, having a first end 45 and a second end 47. A tab 58 slides into the first end 45 and then terminates at the second end 47. The recess 46 secures the tab 48 to the first plate 34.

Figure 6:
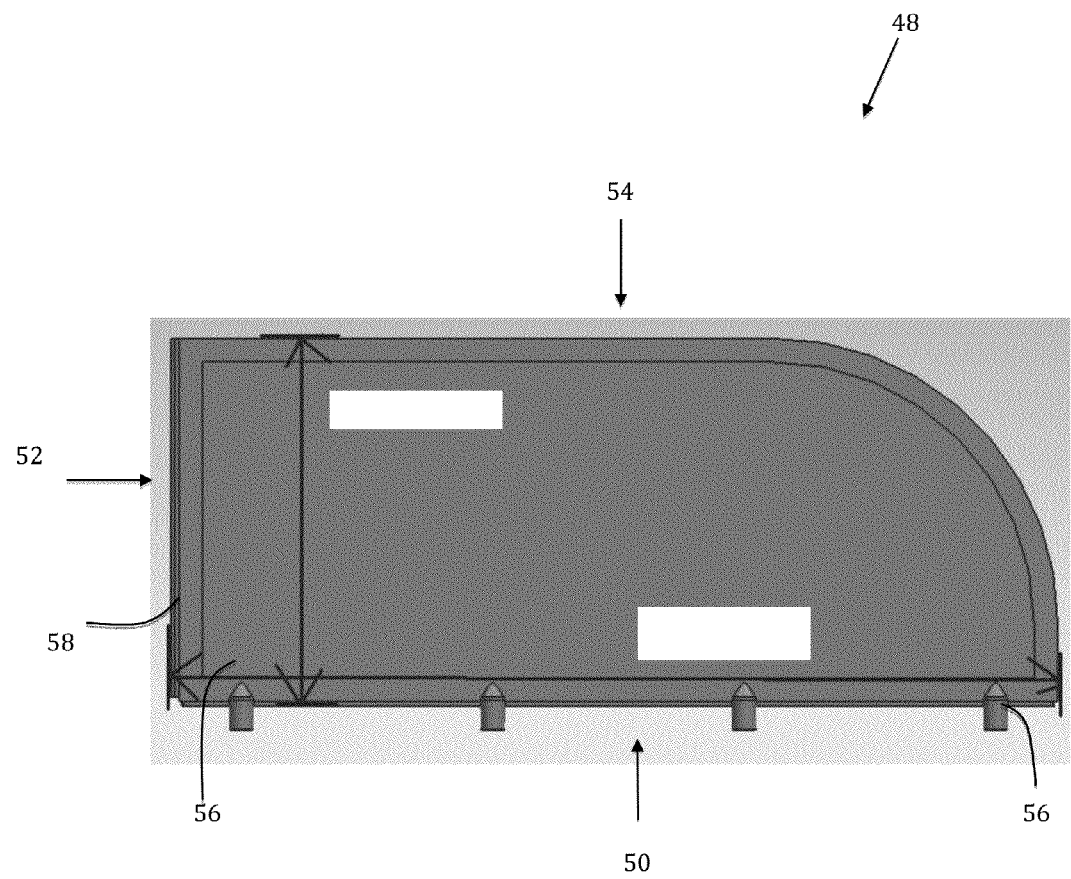
FIG. 6 is a detail view of the aperture on the second wall of FIG. 5.

The second plate and third plates are identical and only one plate will be described in detail. In FIG. 6, the second plate 48 comprises a first side 50, a second side 52, and a third side 54. The first side 50 comprises a plurality of posts 56 that are sized and dimensioned for connected to the apertures 28 on the top of either the left wall 18 or the right wall 20 of the well 26. The second side 52 comprises at least one tab 58 that is sized and dimensioned to fit in the recess 46 in the first plate 34. The tab 58 slides into the recess 46 so that the second plate 48 is secured to the first plate 34. While the second and third plates are shown to have only three sides, the plates may have any number of sides, as long as a first side has a plurality has at least one post 56 and a second side has at least one tab 58.

Figure 7:
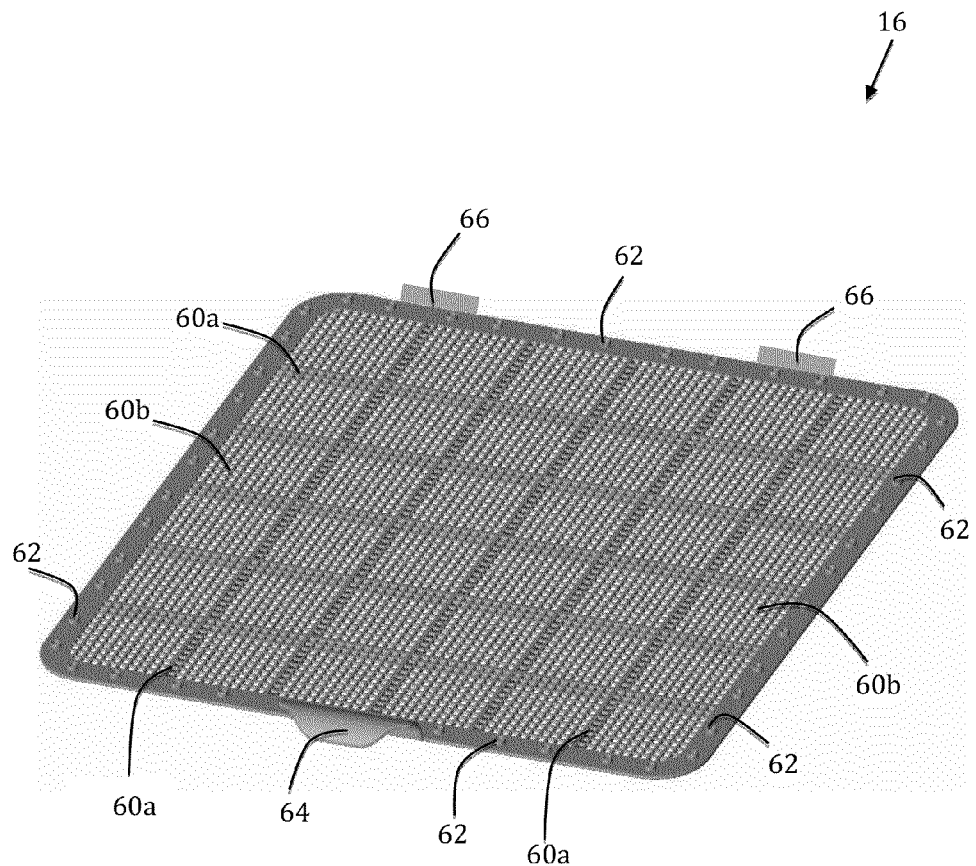
FIG. 7 is a perspective view of the grid of the pet litter box of FIG. 1.
Figure 12:
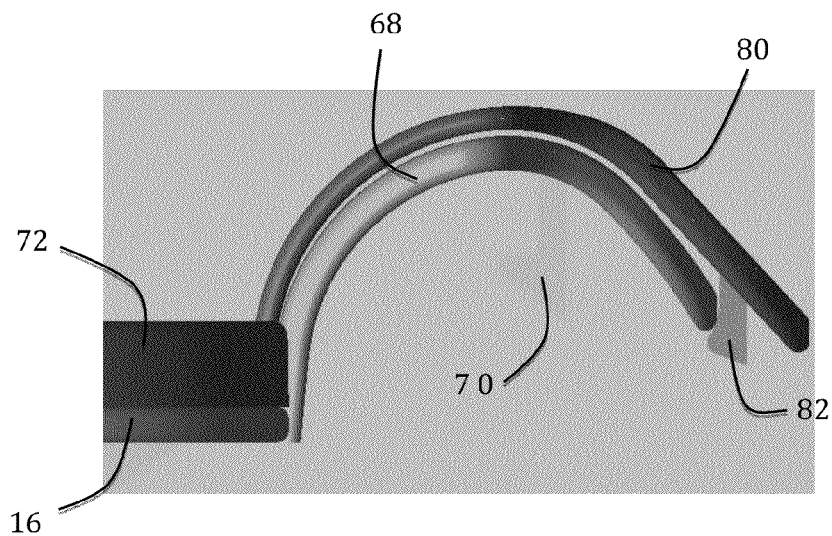
FIG. 12 is detail view of the locking mechanisms on the grid and locking frame of the pet litter box of FIG. 1.

Referring to FIG. 7, the grid 16 comprises a plurality of gridlines 60a and 60b, female cylindrical slots 62, a locking mechanism 64, and extension tabs 66. The major gridlines 60a and minor gridlines 60b define a plurality of grid holes. The perimeter of the grid 16 comprises a plurality of female cylindrical slots 62 that are configured to receive the male cylindrical connectors 78 on the locking frame 72. As shown in FIG. 12, the locking mechanism 64, located on an edge of the grid 16, comprises a curved extension piece 68 with a hook 70.

Figure 8:
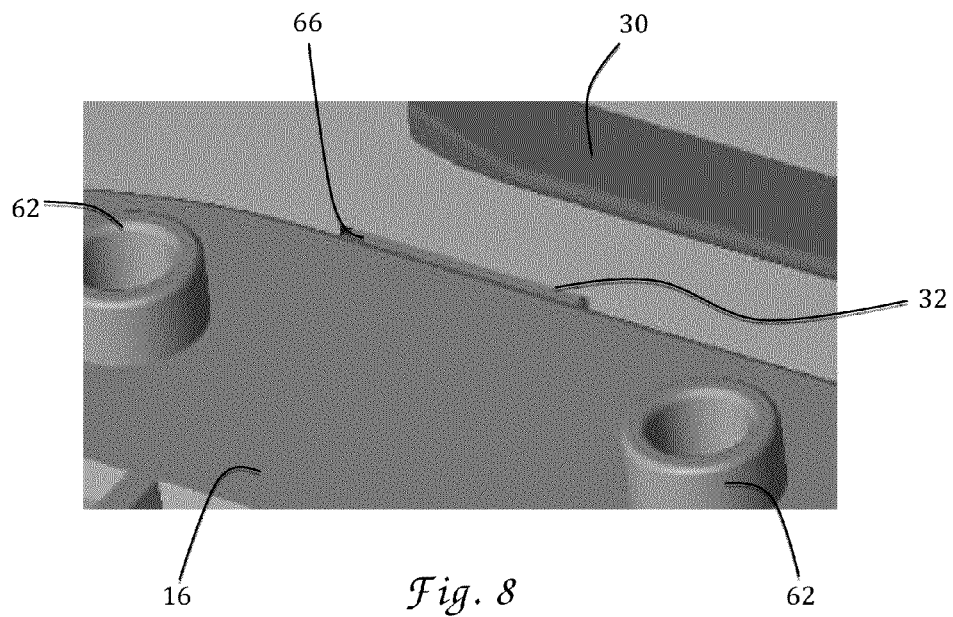
FIG. 8 is a detail view of the grid in the housing of the pet liter box of FIG. 1.

The grid 16 is secured to the housing 12 by the extension tabs 66, the hook 70 in the locking mechanism 64, and the locking frame 72. As shown in FIG. 8, the extension tabs 64, located on an edge of the grid 16, are configured to slide into the depressions 32 in the back wall 22 of the housing 12. The distance between the tabs 66 in the grid 16 is equal to the distance between the depressions 32 in the housing 12. The hook 70 engages with the locking mechanism or tab 27 in the housing 12.

Figure 1:
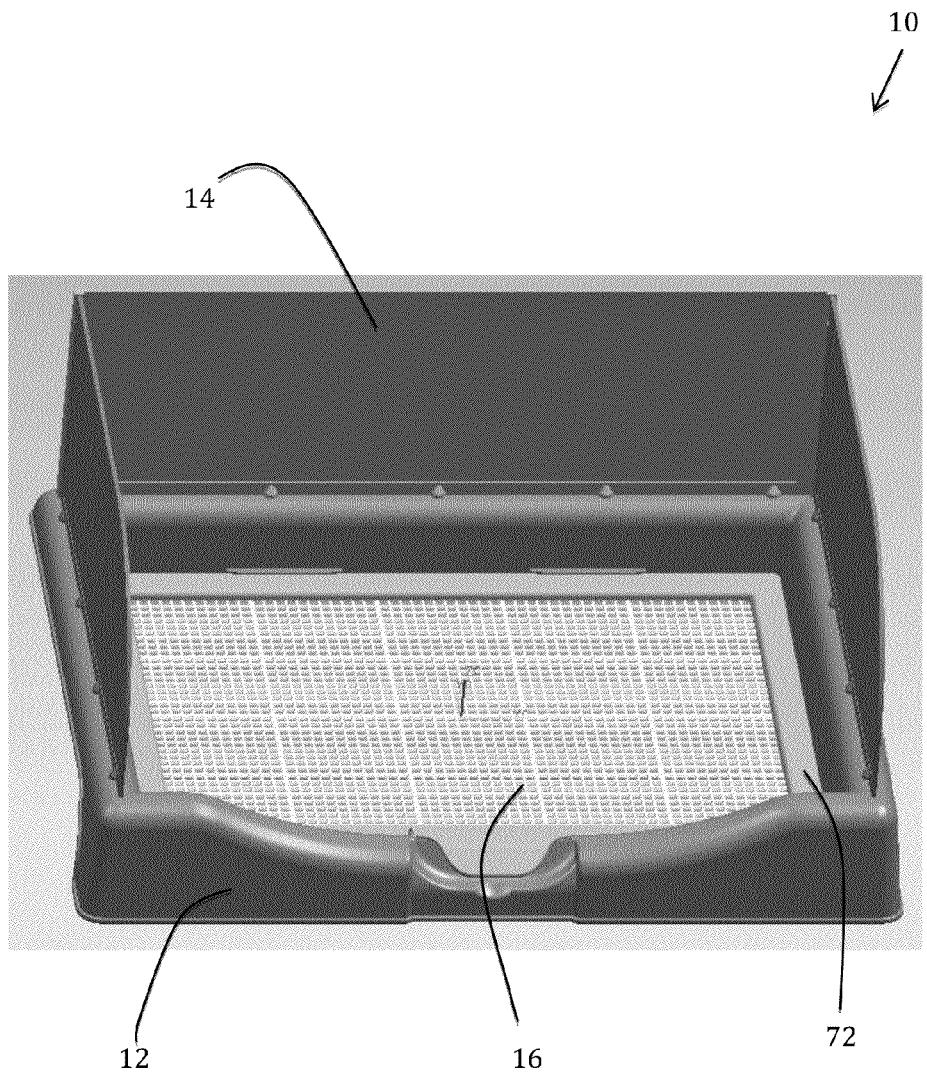
FIG. 1 is a perspective view of the pet litter box.
Figure 9:
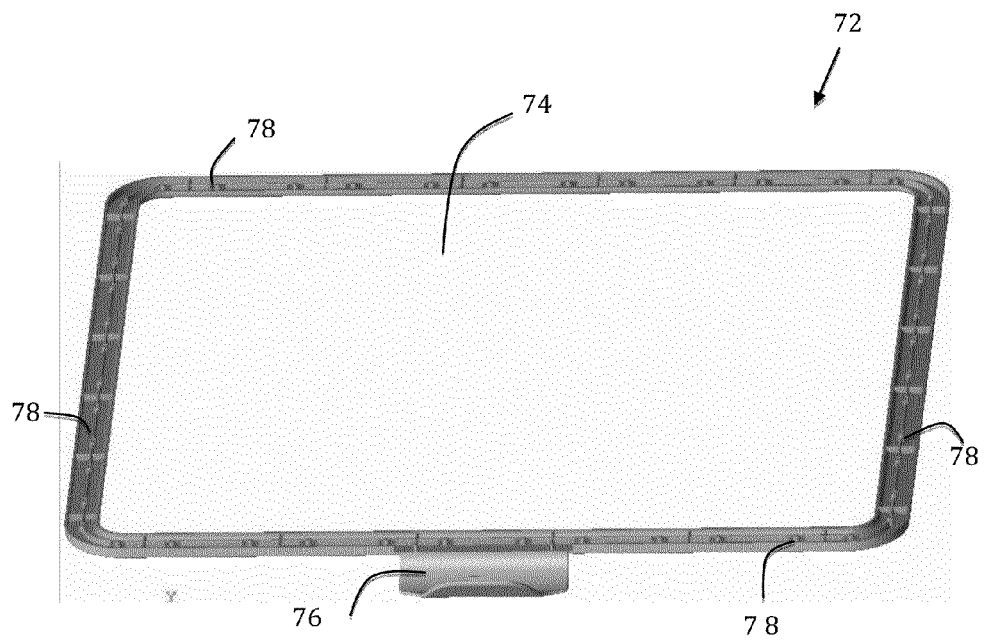
FIG. 9 is a plan view of the second side of the locking frame of the pet litter box of FIG. 1.
Figure 10:
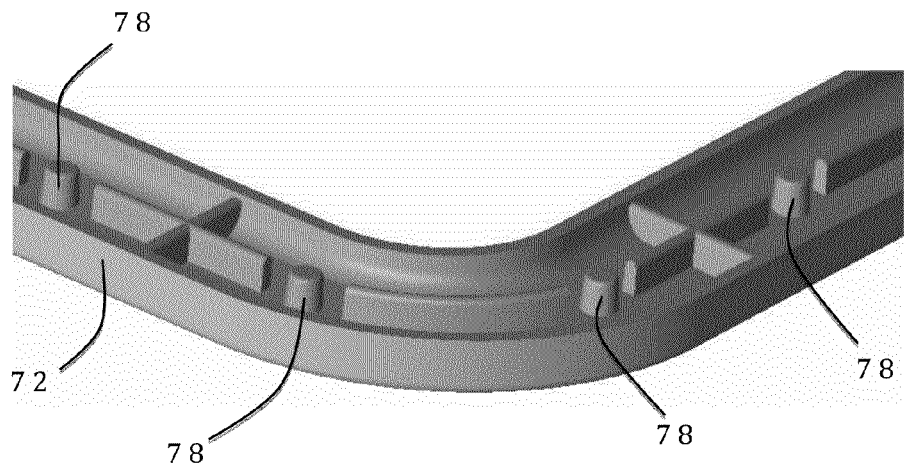
FIG. 10 is a detail view of the locking frame of FIG. 9.
Figure 11:
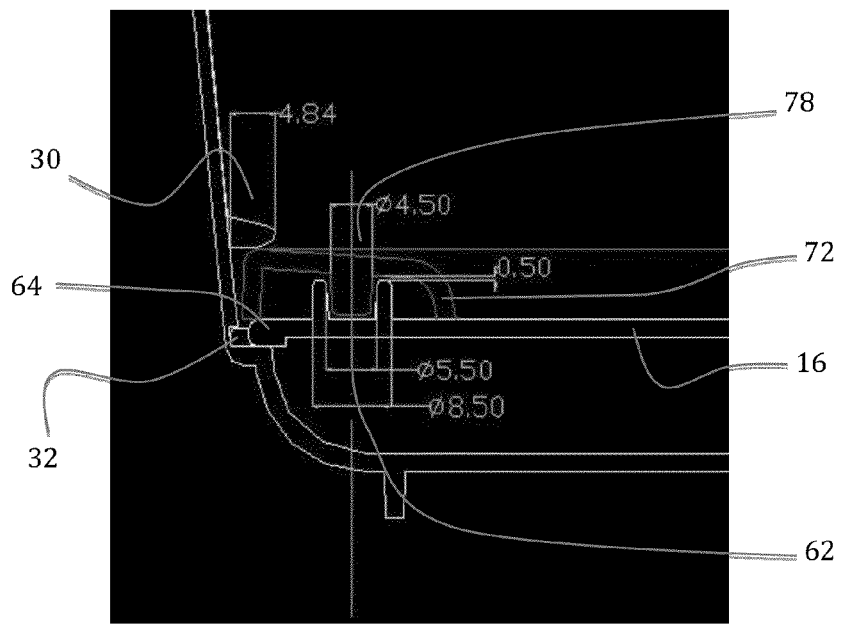
FIG. 11 is a diagram illustrating the housing, grid, and locking frame assembly.

The locking frame 72 is configured to fit over the grid 16 and lock into the well 26 of the housing 12, below the ridges 30. The locking frame 72 comprises a first side, a second side, an aperture 74, and a locking mechanism 76. The first side of the locking frame 72 has a flat surface as shown in FIG. 1. The second side comprises a plurality of male cylindrical connectors 78 that are configured to connect with the female cylindrical slots 62 on the grid 16, as shown in FIGS. 8-10. The aperture 74 allows the gridlines 60a and 60b to be visible when the locking frame 72 engages with the grid 16. FIG. 11 is a diagram illustrating the placement of the grid 16 and the locking frame 72 within the housing 12.

The locking mechanism 76 comprises a curved extension piece 80 with a hook 82, as shown in FIG. 12. The curved extension piece 80 fits over the curved extension piece 68 of the grid 16 and the hook 82 and catches the curved extension piece 68, securing the locking frame 72 to the grid 16.

Figure 13:
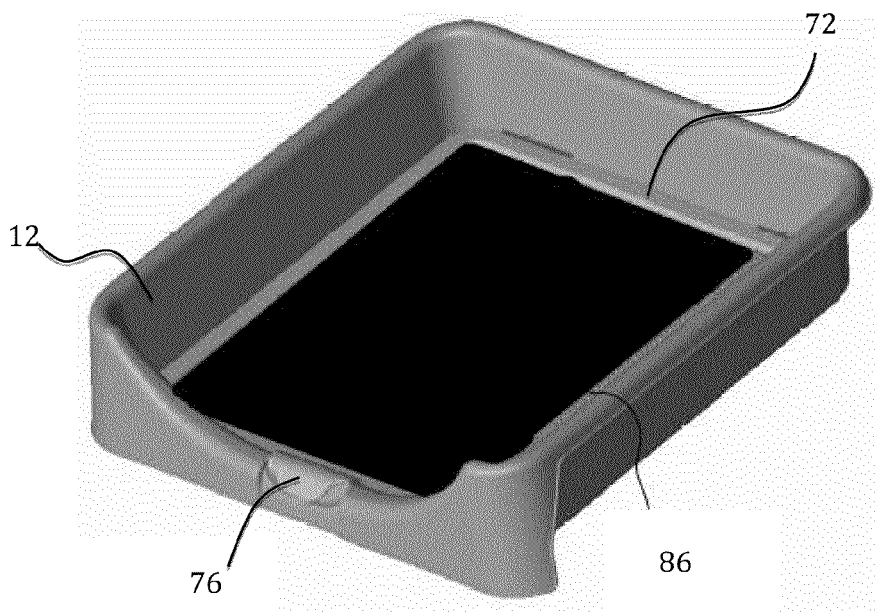
FIG. 13 is a perspective view of the housing, grid, locking frame, and absorbent pad assembly.

The pet litter box 10 may further comprise an absorbent pad 86 between the grid 16 and the locking frame 72, as illustrated in FIG. 13. This absorbent layer is configured in size and shape to completely cover the grid 16 and the locking frame 72 secures the absorbent layer between the grid 16 and locking frame 72 along the edges of the pad.

Figure 14:
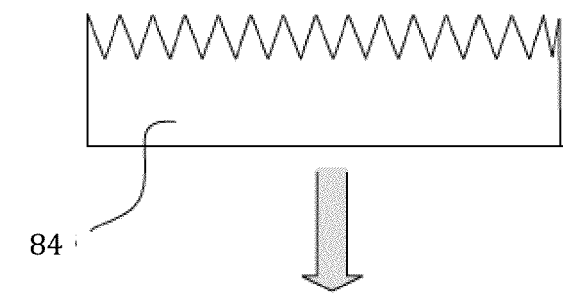
FIG. 14 is a perspective view of the pet litter box with artificial grass.
Figure 14:
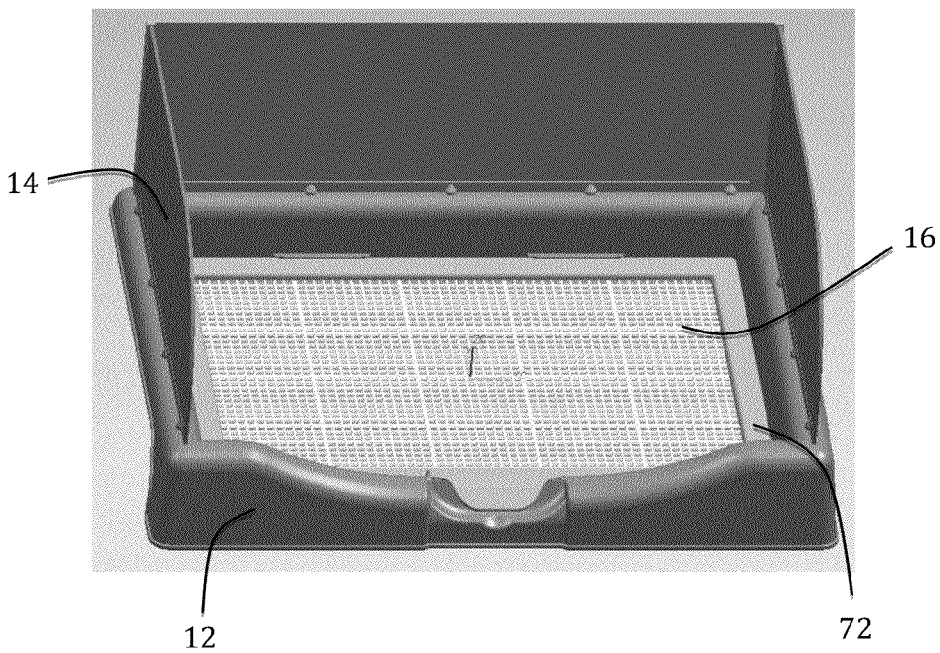

In another variant, the pet litter box 10 may include an artificial grass layer 84, as shown in FIG. 14. The artificial grass 84 may be placed above the absorbent pad (not shown) or placed on the grid 16 without a pad.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A pet litter box, comprising:
   a housing having left, right, front, and back walls defining a well, wherein:
   the left, right, and back walls comprise a plurality of apertures on the top of said left, right, and back walls;
   the left wall further comprises a first plate, having a plurality of sides, wherein a first side has a plurality of posts that connect to said apertures on the top of said left wall and a second side has at least one tab;
   the right wall further comprises a second plate, having a plurality of sides, wherein a first side has a plurality of posts that connect to said apertures on the top of said right wall and a second side has at least one tab; and
   the back wall further comprises a third plate, having a plurality of sides, wherein a first side comprises a plurality of posts that connect to said apertures on the top of said back wall, a second side comprises a recess that connects to said one or more tabs on said first plate, and a third side comprises a recess that connects to said one or more tabs on said second plate;
   a grid comprising a plurality of holes between grid lines configured for the housing, and a locking mechanism along an edge of said grid;
   a locking frame having an aperture, configured to lock over the grid; and
   a locking mechanism on an outside wall of said housing to engage said locking mechanism on said grid.

2. The pet litter box of claim 1, wherein the housing comprises at least one ridge disposed on a wall and at least one depression disposed on at least one wall.

3. The pet litter box of claim 2, wherein the depression is disposed below the ridge and the depression and the ridge are disposed in the same wall.

4. The pet litter box of claim 3, further comprising two ridges spaced apart at an equal height above a bottom of the well and two depressions spaced apart an equal height above the bottom of the well and below the ridges.

5. The pet litter box of claim 4, wherein the grid further comprises two tabs spaced disposed on an edge of the grid and the tabs are spaced apart a distance equal to the spacing of the depressions in the housing.

6. The pet litter box of claim 1, further comprising an absorbent layer between the grid and the locking frame, wherein the absorbent layer is configured in size and shape to completely cover the grid and the locking frame secures the layer to grid along all edges of the layer.

7. The pet litter box of claim 6, further comprising an artificial grass layer above the absorbent pad.

8. The pet litter box of claim 1, wherein the locking frame further comprises a second locking mechanism configured to engage the grid and secure a front of the locking frame to a front of the grid.

9. A pet litter box, comprising:
a housing having left, right, front, and back walls defining a well, wherein:
the left, right, and back walls comprise a plurality of apertures on the top of said left, right, and back walls;
the left wall further comprises a first plate, having a plurality of sides, wherein a first side has a plurality of posts that connect to said apertures on the top of said left wall and a second side has at least one tab;
the right wall further comprises a second plate, having a plurality of sides, wherein a first side has a plurality of posts that connect to said apertures on the top of said right wall and a second side has at least one tab; and
the back wall further comprises a third plate, having a plurality of sides, wherein a first side comprises a plurality of posts that connect to said apertures on the top of said back wall, a second side comprises a recess that connects to said at least one tab on said first plate, and a third side comprises a recess that connects to said at least one tab on said second plate;
a grid having plurality of holes between grid lines and configured to slide and lock into the well of the housing;
a locking frame having an aperture, configured to slide and lock into the well of the housing, and lock onto the grid;
an absorbent layer, between the grid and the locking frame; and
an artificial grass layer above the absorbent layer.

10. A pet litter box, comprising:
a housing having left, right, front, and back walls defining a well, wherein:
the housing comprises at least one ridge disposed on a wall and at least one depression disposed on at least one wall,
said left, right, and back side walls comprise a plurality of apertures on the top of said left, right, and back walls;
said left wall further comprises a first plate, having a plurality of sides, wherein a first side has a plurality of posts that connect to said apertures on the top of said left wall and a second side has at least one tab;
said right wall further comprises a second plate, having a plurality of sides, wherein a first side has a plurality of posts that connect to said apertures on the top of said right wall and a second side has at least one tab; and
said back wall further comprises a third plate, having a plurality of sides, wherein a first side comprises a plurality of posts that connect to said apertures on the top of said back wall, a second side comprises a recess that connects to said at least one tab on said first plate, and a third side comprises a recess that connects to said at least one tab on said second plate;
a grid comprising a plurality of holes between grid lines and configured to slide into said depression said wall of said housing, and a locking mechanism along an edge of said grid;
a locking frame comprising an aperture, configured to slide and lock into the well of the housing, below the ridge and over the grid; and
a locking mechanism on the housing configured to engage said locking mechanism on said grid.

11. The pet litter box of claim 10, wherein the depression is disposed below the ridge and the depression and the ridge are disposed in the same wall of the housing.

12. The pet litter box of claim 11, further comprising two ridges spaced apart at an equal height above a bottom of the well and two depressions spaced apart an equal height above the bottom of the well and below the ridges in the housing.

13. The pet litter box of claim 12, wherein the grid further comprises two tabs disposed on an edge of the grid that are spaced apart a distance equal to the spacing of the depressions in the housing.

14. The pet litter box of claim 10, wherein the locking mechanism along an edge of the grid comprises a male connector and a slot configured to receive the male connector.

15. The pet litter box of claim 14, further comprising an absorbent layer between the grid and the locking frame, wherein the absorbent layer is configured in size and shape to completely cover the grid and the locking frame secures the layer to grid along all edges of the layer.

16. The pet litter box of claim 15, further comprising an artificial grass layer above the absorbent pad.

* * * * *